(12) United States Patent
Nordbruch

(10) Patent No.: US 10,518,785 B2
(45) Date of Patent: Dec. 31, 2019

(54) METHOD AND APPARATUS FOR OPERATING A VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 15/531,101

(22) PCT Filed: Oct. 22, 2015

(86) PCT No.: PCT/EP2015/074484
§ 371 (c)(1),
(2) Date: May 26, 2017

(87) PCT Pub. No.: WO2016/083036
PCT Pub. Date: Jun. 2, 2016

(65) Prior Publication Data
US 2017/0327125 A1    Nov. 16, 2017

(30) Foreign Application Priority Data
Nov. 26, 2014    (DE) .................. 10 2014 224 108

(51) Int. Cl.
*B60W 50/00* (2006.01)
*B60H 1/00* (2006.01)
(Continued)

(52) U.S. Cl.
CPC ......... *B60W 50/0098* (2013.01); *B60H 1/008* (2013.01); *B60H 1/00778* (2013.01);
(Continued)

(58) Field of Classification Search
CPC .. B60W 50/0098; B60W 10/04; B60W 10/22; B60W 10/30; B60W 30/06;
(Continued)

(56) References Cited

U.S. PATENT DOCUMENTS 5,656,799 A * 8/1997 Ramsden ............. G01G 19/005
177/2
7,702,451 B1    4/2010 Crossley
(Continued)

FOREIGN PATENT DOCUMENTS

CN    203381622 U    1/2014
DE    102009038431 A1    2/2011
(Continued)

OTHER PUBLICATIONS

International Search Report dated Jan. 20, 2016 of the corresponding International Application PCT/EP2015/074484 filed Oct. 22, 2015.

*Primary Examiner* — Tuan C To
(74) *Attorney, Agent, or Firm* — Norton Rose Fulbright US LLP; Gerard Messina

(57) ABSTRACT

A method, apparatus, system, vehicle, and/or computer program provides that one or more components of a vehicle are operated as a function of a predetermined pick-up time of the vehicle at a pick-up position of a parking facility in such a way that the vehicle exhibits one or more predetermined states at the pick-up position at the predetermined pick-up time.

27 Claims, 1 Drawing Sheet

(51) Int. Cl.

| | |
|---|---|
| *F02N 11/08* | (2006.01) |
| *B62D 1/181* | (2006.01) |
| *B60W 30/06* | (2006.01) |
| *B60W 10/30* | (2006.01) |
| *B60W 10/22* | (2006.01) |
| *B60W 10/04* | (2006.01) |
| *B60R 25/01* | (2013.01) |
| *B60R 1/062* | (2006.01) |
| *B60N 2/56* | (2006.01) |
| *B60N 2/02* | (2006.01) |
| *B60J 1/00* | (2006.01) |
| *G05D 1/00* | (2006.01) |
| *B60R 16/037* | (2006.01) |
| *B60W 30/18* | (2012.01) |
| *B60R 1/00* | (2006.01) |
| *B60H 1/22* | (2006.01) |

(52) U.S. Cl.
CPC ............. *B60N 2/0248* (2013.01); *B60N 2/56* (2013.01); *B60R 1/002* (2013.01); *B60R 1/062* (2013.01); *B60R 16/037* (2013.01); *B60R 25/01* (2013.01); *B60W 10/04* (2013.01); *B60W 10/22* (2013.01); *B60W 10/30* (2013.01); *B60W 30/06* (2013.01); *B60W 30/18054* (2013.01); *B60W 50/0097* (2013.01); *B62D 1/181* (2013.01); *F02N 11/0807* (2013.01); *F02N 11/0811* (2013.01); *G05D 1/0088* (2013.01); *B60H 2001/2234* (2013.01); *B60W 2510/222* (2013.01); *B60W 2550/12* (2013.01)

(58) Field of Classification Search
CPC ....... B60W 30/18054; B60W 50/0097; B60W 2510/222; B60W 2550/12; B60H 1/00778; B60H 1/008; B60H 2001/2234; B60J 1/002; B60N 2/0248; B60N 2/56; B60R 1/062; B60R 16/037; B60R 25/01; B62D 1/181; F02N 1/0807; F02N 11/0811; G05D 1/0088
USPC .......................................................... 701/25
See application file for complete search history.

(56) References Cited

U.S. PATENT DOCUMENTS

| | | | |
|---|---|---|---|
| 8,589,075 B1* | 11/2013 | Jones | G01C 21/3676 340/995.19 |
| 9,390,062 B1* | 7/2016 | Ashton | G07C 5/008 |
| 2006/0235753 A1 | 10/2006 | Kameyama | |
| 2012/0232965 A1 | 9/2012 | Rodriguez et al. | |
| 2014/0088794 A1* | 3/2014 | Yashiro | G08C 17/02 701/2 |
| 2014/0200765 A1* | 7/2014 | Waeller | H04L 12/282 701/36 |
| 2014/0279596 A1* | 9/2014 | Waris | G06Q 10/083 705/317 |
| 2016/0116293 A1* | 4/2016 | Grover | G01C 21/34 701/23 |
| 2017/0344010 A1* | 11/2017 | Rander | G06Q 50/28 |
| 2018/0319405 A1* | 11/2018 | Heinze | B60W 30/143 |

FOREIGN PATENT DOCUMENTS

| | | |
|---|---|---|
| DE | 102010034959 A1 | 2/2012 |
| DE | 102011106357 A1 | 8/2012 |
| DE | 102012217615 A1 | 5/2014 |
| EP | 1020309 A1 | 7/2000 |
| JP | H0842180 A | 2/1996 |
| JP | H08175150 A | 7/1996 |
| JP | 2009113674 A | 5/2009 |
| JP | 2014102750 A | 6/2014 |
| JP | 2015219811 A | 12/2015 |

* cited by examiner

METHOD AND APPARATUS FOR OPERATING A VEHICLE

CROSS-REFERENCE TO RELATED APPLICATIONS

The present application is the national stage of International Pat. App. No. PCT/EP2015/074484 filed Oct. 22, 2015, and claims priority under 35 U.S.C. § 119 to DE 10 2014 224 108.1, filed in the Federal Republic of Germany on Nov. 26, 2014, the content of each of which is incorporated herein by reference in its entirety.

FIELD OF THE INVENTION

The present invention relates to a method and an apparatus for operating a vehicle. The invention also relates to a system for operating a vehicle, a vehicle, as well as a computer program.

BACKGROUND

The published patent application U.S. 2012/0232965 A1 describes a computer-implemented system for the assisted parking of a vehicle. In that case, a driver of a vehicle hands over his vehicle at a hand-over location to a parking attendant, who subsequently parks it. It is further described that the driver of the vehicle is able to request his vehicle via a mobile application, e.g., via a smartphone. In so doing, there are various options available to the driver, particularly where and when he wants to receive his vehicle.

SUMMARY

An aspect of the present invention is directed to an improved method for operating a vehicle. Another aspect of the present invention is directed to an improved apparatus for operating a vehicle. Another aspect of the present invention is directed to an improved system for operating a vehicle. Another aspect of the present invention is directed to an improved vehicle. Another aspect of the present invention is directed to an improved computer program.

According to an aspect, in a method for operating a vehicle, one or more components of the vehicle are operated as a function of a predetermined pick-up time of the vehicle at a pick-up position of a parking facility in such a way that the vehicle exhibits one or more predetermined states at the pick-up position at the predetermined pick-up time.

According to another aspect, an apparatus for operating a vehicle includes a control device for controlling one or more vehicle components as a function of a predetermined pick-up time of the vehicle at a pick-up position of a parking facility in such a way that the vehicle exhibits one or more predetermined states at the pick-up position at the predetermined pick-up time.

According to a further aspect, a system for operating a vehicle includes one or more vehicle components and the apparatus described herein.

According to a further aspect, a vehicle includes the apparatus or system described herein.

According to another aspect, a computer program includes program code for carrying out the method described herein when the computer program is executed on a computer.

In particular, the invention thus includes the idea to control components of a vehicle in such a way that the vehicle exhibits one or more predetermined or defined states at a predetermined pick-up time. In this context, the pick-up time corresponds to a time at which the vehicle is to be picked up from a pick-up position of a parking facility. Notably, this yields the technical advantage that the vehicle already exhibits the one or more predetermined or defined states at the predetermined pick-up time, thus saving time in so far as a driver of the vehicle no longer has to wait when picking up his vehicle, because the vehicle must first assume these predetermined states, for it already exhibits the predetermined states. The driver therefore no longer has to wait for it. Depending on the vehicle components, this may also signify increased comfort for the driver or other vehicle occupants.

A parking facility within the meaning of the present invention may also be referred to as a parking lot, and is used as parking area for vehicles. Specifically, the parking facility thus forms one coherent area which has a plurality of parking spaces (in the case of a parking facility on private property) or parking spots (in the case of a parking facility on public property). According to one specific embodiment, the parking facility includes a car park. In particular, the parking facility includes a garage.

A drop-off position within the meaning of the present invention is a position at which a driver of the vehicle is able to switch off the driver's vehicle for an autonomous parking process, and from which the driver can pick up the vehicle again at a later time.

According to one specific embodiment, the pick-up position is the drop-off position.

In another specific embodiment, the pick-up position is different from the drop-off position.

A parking position within the meaning of the present invention is a position at which the vehicle is intended to park autonomously.

In one specific embodiment, the vehicle navigates autonomously from the drop-off position to the parking position.

In a further specific embodiment, the vehicle parks autonomously in the parking position.

In another specific embodiment, the vehicle gets out from the parking position autonomously.

According to a further specific embodiment, the vehicle navigates autonomously from the parking position to the drop-off position.

Autonomous for the purposes of the present invention means, in particular, that the vehicle navigates independently, thus, without intervention by a driver. Hence, the vehicle drives independently in the parking facility, without a driver having to control the vehicle for that purpose. In particular, that means, for example, that the vehicle thus includes a guidance device for guiding the vehicle. The guidance device guides the vehicle autonomously for the navigation. Namely, navigation includes guidance. In particular, guidance includes lateral guidance and/or longitudinal guidance of the vehicle. Such an autonomously driving vehicle which is able to get into and out of a parking space automatically is known, for example, as an automatic valet parking (AVP) vehicle, also referred to a vehicle that is configured to perform an automatic parking process. Vehicles which do not have this AVP functionality are referred to as standard vehicles, for example.

According to other specific embodiments, the vehicle is guided in the parking facility by remote control. In other words, the vehicle is guided by remote control from the drop-off position to the parking position and/or from the parking position to the drop-off position or pick-up position.

In the case of fully automated (autonomous) valet parking, the vehicle is parked by its driver at a drop-off location, for example, in front of a parking garage, and from there, the vehicle drives on its own into a parking position/parking space, and back again to the drop-off location or to the pick-up position.

According to one specific embodiment, the one or more vehicle components include an engine-independent heater and/or an air-conditioning system, which is/are operated as a function of the predetermined pick-up time in such a way that the vehicle has a predetermined passenger-compartment temperature as the predetermined state. In particular, this provides the technical advantage that at the time of pick-up, a driver or a passenger finds a vehicle which has a predetermined passenger-compartment temperature. This means special comfort for the driver or the passengers. Preferably, the air-conditioning system and/or the engine-independent heater is/are operated in a recirculation mode or in a fresh-air mode. In the recirculation mode, an air supply from outside is blocked, so that, for example, no automotive exhaust gas is able to get into the passenger compartment. In the fresh-air mode, an air feed from outside is open, so that outside air is able to get into the passenger compartment. Preferably, the quality of air surrounding a vehicle is measured, either the recirculation mode or the fresh-air mode being selected as a function of the measured air surrounding the vehicle. For example, the measurement is performed with the aid of a pollutants sensor.

In another specific embodiment, the one or more vehicle components feature one or more vehicle seat heaters which are operated as a function of the predetermined pick-up time in such a way that as predetermined state, the vehicle has vehicle seats, assigned to the one or more vehicle seat heaters, which have a predetermined vehicle seat temperature. In particular, this yields the technical advantage that the vehicle seats have a predetermined vehicle seat temperature at the predetermined pick-up time. This also means considerable comfort for vehicle passengers or the driver.

In another specific embodiment, the one or more vehicle components include one or more driver assistance systems which are operated as a function of the predetermined pick-up time in such a way that as predetermined state, the vehicle has one or more driver assistance systems ready for use. Driver assistance systems are, for example: traffic sign recognition system, lane keeping assist, lane warning system, adaptive cruise control (ACC), electronic stability program (ESP), antilock braking system (ABS).

In another specific embodiment, the one or more vehicle components feature one or more window heaters which are operated as a function of the predetermined pick-up time in such a way that as predetermined state, the vehicle has windows, assigned to the one or more window heaters, which are at least partially defrosted, preferably completely defrosted. In particular, this provides the technical advantage that the windows are at least partially or completely defrosted at the predetermined pick-up time. This results in improved visibility out of the vehicle for the driver or the passengers. Advantageously, this is able to increase traffic safety.

According to one specific embodiment, the one or more vehicle components include one or more seat-adjustment devices for the respective adjustment of a seat, the seat-adjustment devices being operated as a function of the predetermined pick-up time in such a way that as predetermined state, the vehicle has seats which are adjusted in a predetermined position. Namely, a technical advantage is thereby attained that at the predetermined pick-up time, the driver or the passengers discover seats that have a predetermined position. Thus, they no longer have to be adjusted when the driver or the passengers come to the vehicle to pick it up. In particular, the predetermined position is a function of a definite person. That means, namely, that a specific personal profile is thus set, based on which the seat or seats is/are adjusted.

According to one specific embodiment, the one or more vehicle components include a steering-wheel adjustment device for adjusting a steering wheel, the steering-wheel adjustment device being operated as a function of the predetermined pick-up time in such a way that as predetermined state, the vehicle has a steering wheel which is adjusted in a predetermined position. In particular, this provides the technical advantage that at the predetermined pick-up time, the vehicle has a steering wheel which is adjusted in a predetermined or defined position. Thus, the steering wheel no longer has to be adjusted when the driver gets into the vehicle. Advantageously, this means a savings in time for the driver. According to one specific embodiment, analogous to the seat-adjustment devices, it may also be provided here that the predetermined position of the steering wheel is a person-specific position. In particular, that means that the steering wheel is thus adjusted as a function of a personal profile.

According to a further specific embodiment, the one or more vehicle components include one or more mirror-adjustment devices for the respective adjustment of a mirror, the mirror-adjustment devices being operated as a function of the predetermined pick-up time in such a way that as predetermined state, the vehicle has one or more mirrors which are adjusted in a predetermined position. Notably, this yields the technical advantage that the mirrors are already adjusted when a driver or vehicle passengers want to pick up the vehicle at the predetermined pick-up time. Time is saved in advantageous manner here, as well. According to one specific embodiment, it is also provided here that the mirror positions are dependent on the user. In other words, a user or personal profile is thus preset, which has one or more mirror positions.

According to a further specific embodiment, the one or more vehicle components include a radio and/or a navigation device which is/are operated as a function of the predetermined pick-up time in such a way that prior to the predetermined pick-up time, they request current and/or future traffic information via a communication network, in order to still be able to download (and notably, also do download) the current and/or future traffic information via the communication network prior to the predetermined pick-up time, so that as predetermined state, the vehicle has a radio and/or a navigation device in which current and/or future traffic information is stored.

In particular, this yields the technical advantage that current and/or future traffic information is available to a driver or vehicle passengers at the predetermined pick-up time. Time is saved in advantageous manner, as well. As a rule, a radio or a navigation device requires a certain time to request current and/or future traffic information via the communication network and then to download it. Therefore, the driver or the passenger no longer has to wait for the traffic information; rather, they are able to immediately carry out planning with regard to a specific travel route for the vehicle based on the traffic information.

According to one specific embodiment, the communication network includes a WLAN network and/or a mobile radio network.

In another specific embodiment, the communication via the communication network is encrypted.

According to a further specific embodiment, the one or more vehicle components feature a door actuator for unlocking and locking one or more vehicle doors, which is operated as a function of the predetermined pick-up time in such a way that it unlocks the one or more vehicle doors, so that as predetermined state, the vehicle has one or more unlocked vehicle doors at the predetermined pick-up time. In particular, this provides the technical advantage that time is saved, in so far as the driver or passengers no longer have to unlock the vehicle doors themselves. They are already open when the predetermined pick-up time is reached. This also means considerable convenience for the driver or passengers.

According to a further specific embodiment, regardless of the passing of the predetermined pick-up time, the door actuator only unlocks the one or more vehicle doors if one or more persons are detected at the pick-up position. In particular, this yields the technical advantage that anti-theft protection is increased, for the doors of the vehicle are thus no longer unlocked if no person is at the vehicle. In other words, the vehicle doors are therefore not unlocked unintentionally. As a rule, the people who are detected at the pick-up position are the people who also want to pick up the vehicle, thus, for example, the driver or passengers. That is to say, therefore, that according to this specific embodiment, the vehicle door is not unlocked even after the predetermined pick-up time has passed if no person is detected at the pick-up position. According to one specific embodiment, this, in particular, when no person is detected at the pick-up position at the predetermined pick-up time.

According to a further specific embodiment, the door actuator unlocks the one or more vehicle doors only when the one or more detected persons have been checked to the effect that they are authorized for access to the vehicle. In particular, this provides the technical advantage that not just any people who are at the pick-up position are able to cause the vehicle doors to unlock, for only authorized people are able to unlock the vehicle doors solely by their presence at the pick-up position. Anti-theft security is thereby increased.

That is to say, according to this specific embodiment, in order for the door actuator to unlock the one or more vehicle doors there must be passage of the predetermined pick-up time, detection of one or more persons at the pick-up position, and positive check to the effect that the detected people are authorized for access to the vehicle.

According to another specific embodiment, the one or more vehicle components include a navigation device which is operated as a function of the predetermined pick-up time in such a way that prior to the predetermined pick-up time, it ascertains a route to a desired destination position, so that as predetermined state, the vehicle has a navigation device which is prepared for navigation to the desired destination position.

Notably, this provides the technical advantage that time is saved, in so far as the navigation device does not first begin to ascertain the route when a driver gets into the vehicle. In this respect, the navigation device is ready for navigation to the desired destination position. As a rule, a certain time is needed for a navigation device to ascertain a route to a desired destination position. However, the navigation device finishes this ascertainment prior to the passing of the predetermined pick-up time.

According to one specific embodiment, the destination position is transmitted to the navigation device via a communication network.

According to one specific embodiment, after a driver of the vehicle has been detected getting into the vehicle, the navigation device, with the aid of a human-machine interface, makes the ascertained route available to the driver who has entered. In particular, this yields the technical advantage that the ascertained route is provided immediately and automatically to the driver. The driver therefore has immediate and direct knowledge about which route the navigation device has ascertained to the desired destination position. Therefore, he himself no longer has to operate the navigation device in order to make the ascertained route available.

According to one specific embodiment, the human-machine interface includes a video screen and/or an acoustic and/or a haptic output device.

According to a further specific embodiment, the one or more vehicle components include a drive motor of the vehicle, the drive motor being operated as a function of the predetermined pick-up time in such a way that as predetermined state, the vehicle has a started drive motor, so that the vehicle is able to drive off at the predetermined pick-up time.

In particular, this yields the technical advantage of a savings in time in this respect, that the driver is able to drive off with the vehicle immediately after getting into the vehicle, for the drive motor is already started. This can also provide a convenience for the driver or passengers.

In one specific embodiment, a predefined drive-motor dynamics mode is adjusted, so that as predetermined state, the vehicle has a drive motor with a predefined drive-motor dynamics mode. For example, a drive-motor dynamics mode is: sport, normal, eco.

In one specific embodiment, the one or more vehicle components include a ride-adjustment device of the vehicle, the ride-adjustment device being operated as a function of the predetermined pick-up time in such a way that as predetermined state, the vehicle has a predefined adjusted ride, for example, hard, medium or soft.

In one specific embodiment, the one or more vehicle components include an electronic stability program (ESP) of the vehicle, the electronic stability program being operated as a function of the predetermined pick-up time in such a way that as predetermined state, the vehicle has a switched-on or a switched-off electronic stability program.

In one specific embodiment, the one or more vehicle components include a front-passenger-side airbag of the vehicle, the front-passenger-side airbag being operated as a function of the predetermined pick-up time in such a way that as predetermined state, the vehicle has an activated or a deactivated front-passenger-side airbag.

In another specific embodiment, the predetermined pick-up time is determined and/or checked based on position data of a mobile terminal of a vehicle user, in order to determine a new pick-up time as the predetermined pick-up time based on the checking.

That means, in particular, that based on the position data, a distance is thus able to be determined between the vehicle and the mobile terminal. Based on that, for example, it is possible to ascertain a time needed for the vehicle user to reach the vehicle. In this ascertainment, it is especially taken into account that the direct shortest distance between the vehicle and the mobile terminal does not necessarily have to correspond to that distance or that route which the vehicle user is able to cover in order to arrive at the vehicle. For example, a vehicle user must take a predetermined route to the user's vehicle at the pick-up position, which does not correspond to the route as the crow flies or the shortest path between the vehicle and the current position.

When checking, it is especially checked whether the ascertained pick-up time has changed. If yes, a new pick-up time is ascertained, which is then used as predetermined pick-up time.

Advantageously, delays or hold-ups can thus also be factored in. In particular, it is possible to take into account if the vehicle user is moving faster than anticipated to his vehicle. Improved control or improved operation of the individual vehicle components is thereby made possible, so that they also actually bring about the predetermined state of the vehicle when the driver or a passenger, thus, in general, a vehicle user, comes to the pick-up position.

According to one specific embodiment, the apparatus is equipped to implement or carry out the method according to the present invention. According to another specific embodiment, the system is equipped to implement or carry out the method according to the present invention. According to a further specific embodiment, the vehicle is equipped to implement or carry out the method according to the present invention.

According to one specific embodiment, the navigation device receives the desired destination position via the communication network, and calculates or determines a route to the destination position based on the destination position. In other words, here, for example, the driver communicates to the navigation device, a destination to be driven to, so that the navigation device calculates the route to that place.

In one specific embodiment, the navigation device receives a route to the destination position via the communication network. In particular, this yields the technical advantage that the navigation device itself no longer has to calculate a route. It is able to use the transmitted route for the navigation. That is, here, for example, a terminal, especially a mobile terminal, of the driver is able to calculate the route, and after calculating it, transmit it to the navigation device via the communication network.

Apparatus features are obtained analogously from corresponding method features and vice versa.

The present invention is explained in greater detail below on the basis of preferred exemplary embodiments.

DETAILED DESCRIPTION

Figure 1:
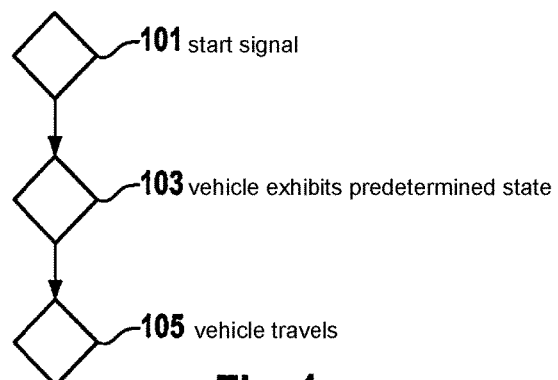
FIG. 1 is a flowchart of a method for operating a vehicle, according to an example embodiment of the present invention.

FIG. 1 is a flowchart of a method for operating a vehicle, according to an example embodiment of the present invention. The vehicle is in a parking position in a parking facility. That is, the vehicle is thus parked in a parking position in the parking facility. In a step 101, a start signal to start the vehicle, especially to start a drive motor, is transmitted to the vehicle via a communication network.

In particular, the start signal includes the information as to when the vehicle is to be picked up at a pick-up position of the parking facility. In other words, the start signal thus includes a predetermined pick-up time. As a function of the predetermined pick-up time, the vehicle drives autonomously to the pick-up position in such a way that it arrives punctually at the pick-up position at the predetermined pick-up time. In doing this, for example, traffic in the parking facility, thus, especially traffic density of further vehicles in the parking facility, can be taken along into consideration. In particular, a distance to be covered from the parking position to the pick-up position is taken into account here. Thus, the time the vehicle needs to get from the parking position to the pick-up position is factored in. Accordingly, the vehicle will set off at the right time from the parking position to the pick-up position in order to arrive punctually at the pick-up position at the predetermined pick-up time.

Based on the predetermined pick-up time, according to a step 103 in the present invention, one or more components of the vehicle are operated in such a way that the vehicle exhibits one or more predetermined states at the pick-up position at the predetermined pick-up time.

According to a step 105, the vehicle travels from the parking position to the pick-up position.

Depending on the vehicle components and/or depending on the predetermined pick-up time, the vehicle components are already put into operation at the parking position and/or not until on the trip from the parking position to the pick-up position and/or only after arrival of the vehicle at the pick-up position. Thus, for example, it is expedient that an air-conditioning system and/or an engine-independent heater and/or a vehicle seat heater is/are already switched on at the parking position, so that sufficient time is available to reach the predetermined passenger-compartment temperature and predetermined vehicle seat temperature, respectively, for as a rule, the time the vehicle stands at the pick-up position is too short to be able to reach the predetermined temperatures if the vehicle seat heaters and the engine-independent heater and the air-conditioning system are first switched on at the pick-up position.

However, it is usually sufficient if the adjustment devices do not adjust their corresponding elements, thus, for example, the steering wheel, mirrors or seats, until after arrival or at least not until on the trip from the parking position to the pick-up position, for these adjustments normally require only a short time, e.g., a maximum of one minute.

Figure 2:
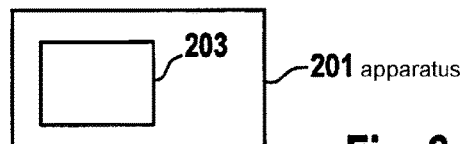
FIG. 2 illustrates an apparatus for operating a vehicle, according to an example embodiment of the present invention.

FIG. 2 shows an apparatus 201 for operating a vehicle.

Apparatus 201 includes a control device 203 for controlling one or more vehicle components as a function of a predetermined pick-up time of the vehicle at a pick-up position of a parking facility in such a way that the vehicle exhibits one or more predetermined states at the pick-up position at the predetermined pick-up time.

According to one specific embodiment, apparatus 201 includes a communication interface which is designed to receive a start signal and/or a predetermined pick-up time via a communication network.

According to one specific embodiment, apparatus 201 includes a processor which is designed, based on position data of a terminal, particularly a mobile terminal, of a vehicle user, to ascertain and/or to check a predetermined pick-up time in order to ascertain a new pick-up time as the predetermined pick-up time based on the checking.

According to one specific embodiment, the communication interface is designed to receive position data of a terminal, especially a mobile terminal, of a vehicle user.

According to one specific embodiment, the mobile terminal is a cell phone, e.g., a smartphone.

Figure 3:
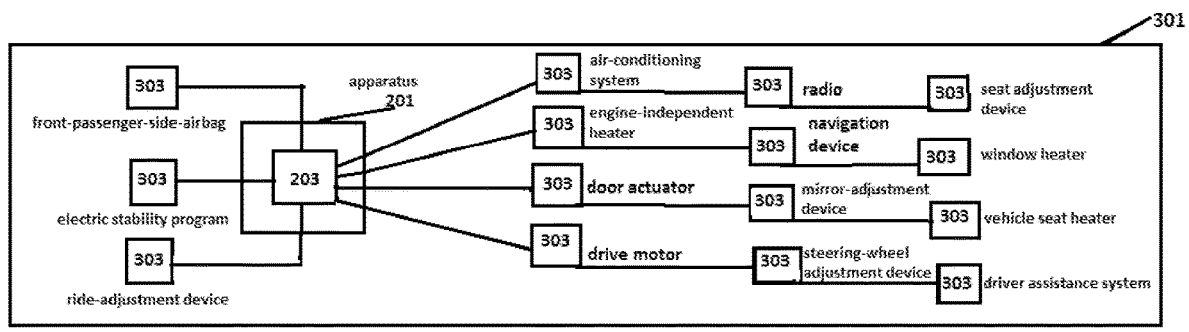
FIG. 3 illustrates a system for operating a vehicle, according to an example embodiment of the present invention.

FIG. 3 shows a system 301 for operating a vehicle.

System 301 includes a plurality of vehicle components 303 and apparatus 201 of FIG. 2. In a specific embodiment not shown, only one vehicle component 303 is provided.

Figure 4:
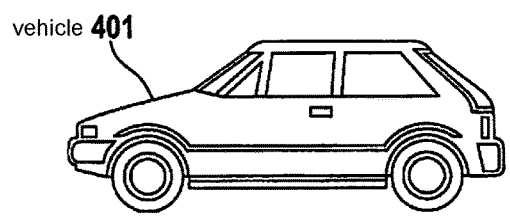
FIG. 4 illustrates a vehicle, according to an example embodiment of the present invention.

FIG. 4 shows a vehicle 401. For example, vehicle 401 includes apparatus 201 of FIG. 2 or system 301 of FIG. 3, which, for the sake of the overall view, are not drawn in in FIG. 4.

Thus, in summary, the invention provides an efficient concept, based on which, certain comfort aspects can be made available individually or in any possible combination to a driver or passengers of a vehicle. In particular, this is accomplished just in time at the predetermined pick-up time, thus, when the driver or the passengers want to pick up the vehicle at the pick-up position. Examples of such comfort aspects are as follows.

A passenger compartment is heated in advance to a preset temperature, e.g., with the aid of an engine-independent heater and/or an air-conditioning system.

For instance, one or more vehicle seats are preheated by one or more seat heaters to a preset temperature.

For example, one or more vehicle windows are not steamed up and/or iced, thus, in particular, are at least partially defrosted or at least partially de-fogged. In particular, this is accomplished with the aid of one or more window heaters. Notably, this is accomplished by an air flow that, for example, can be adjusted with the aid of an engine-independent heater and/or an air-conditioning system, this air flow preferably being directed toward the windows.

For example, traffic news, thus, in general, traffic information, e.g., present and/or future traffic information, is up-to-date, that is, is current, for in the case of known radios or navigation devices, it is generally necessary to wait for a time until they have downloaded the current information or the future information. In other words, in the case of today's vehicles, normally the radio and/or the navigation device must therefore already be switched on for a time.

For example, a navigation device has already calculated a desired and/or communicated route. For instance, the navigation device informs the driver about the route; in particular, the navigation device informs the driver about obstructions in the route.

According to one specific embodiment, the navigation device receives the desired destination position via the communication network, and calculates or determines a route to the destination position based on the destination position. In other words, here, for example, the driver communicates to the navigation device a destination to be driven to, so that the navigation device calculates the route to that place.

In one specific embodiment, the navigation device receives a route to the destination position via the communication network. In particular, this yields the technical advantage that the navigation device itself no longer has to calculate a route. It may use the transmitted route for the navigation. That is, here, for example, a terminal, especially a mobile terminal, of the driver is able to calculate the route, and after calculating it, transmit it to the navigation device via the communication network.

For example, driver-specific or passenger-specific adjustments (seat, mirror, steering wheel) are already set, thus, preset for the driver or passengers. In this context, the driver specifically is the person who will drive the vehicle away from the pick-up position. For example, a storage device is provided here, which has stored various setting profiles or personal profiles that preset corresponding adjustments of the seats, the mirrors, and/or the steering wheel for various drivers or passengers.

Preferably one or more vehicle doors is/are able to unlock automatically upon request after the driver (including further drivers or passengers) stands in front of the vehicle when the vehicle is in the pick-up position.

For example, a trunk opens automatically upon request after the driver (including further drivers or passengers) stands in front of the vehicle when the vehicle is in the pick-up position.

For example, the vehicle is started and is ready to drive away immediately from the pick-up position.

According to one specific embodiment, a vehicle door is a trunk door.

In particular, the present invention is therefore based on the idea, for example, that the vehicle is already started beforehand based on the predetermined pick-up time, thus, when the vehicle must be at the pick-up position or pick-up location, one or more actions, for example one or more of the following example actions, being started or carried out individually or in combination for the desired comfort themes or comfort aspects:

- an engine-independent heater and/or an air-conditioning system is/are switched on.
- one or more seat heaters are switched on or turned on;
- one or more window heaters are switched on or turned on;
- a radio device and/or a navigation device is/are turned on or switched on, so that advantageously, they are able to download or do download future and/or current traffic information via a communication network;
- the navigation device preprograms itself with a desired transmitted route, especially taking into account the traffic obstructions, and is thus ready for a route guidance;
- driver-specific or passenger-specific settings are adjusted at the seat, steering wheel, and/or mirrors for the desired transmitted driver and possibly also for the front-seat passengers or further vehicle occupants;
- one or more actions relating to the unlocking of the vehicle doors, e.g., the trunk, initiated or carried out at the pick-up position, for example, the unlocking only being carried out if the driver is actually at the vehicle, i.e., in response to positive identification or authorization, for example, where the authorization can be effected by an identification and an exchange with a mobile terminal or mobile device and/or a key system of the vehicle;
- after the driver has gotten into the vehicle, the route together with the any existing traffic obstructions are communicated to the driver immediately, e.g., with the aid of a human-machine interface; and
- the vehicle is already started at the pick-up position at the predetermined pick-up time, so that a driver is able to start or drive off immediately.

What is claimed is:

1. A method comprising:
    operating one or more vehicle components of a vehicle as a function of a predetermined pick-up time of the vehicle at a pick-up position of a parking facility in such a way that the vehicle exhibits one or more predetermined states at the pick-up position at the predetermined pick-up time,
    wherein the one or more vehicle components includes:
        at least one of an engine-independent heater and an air-conditioning system operated whose operation as a function of the predetermined pick-up time is such that the vehicle has a predetermined passenger-compartment temperature;
        one or more driver assistance systems operated as a function of the predetermined pick-up time in such a way that, as one of the one or more predetermined states, the vehicle has one or more driver assistance systems ready for use;

one or more vehicle seat heaters operated as a function of the predetermined pick-up time in such a way that, as one of the one or more predetermined states, at least one seat of the vehicle assigned to the one or more vehicle seat heaters has a predetermined vehicle seat temperature;

one or more window heaters operated as a function of the predetermined pick-up time in such a way that, as one of the one or more predetermined states, at least one window of the vehicle assigned to the one or more window heaters is at least partially defrosted;

one or more seat-adjustment devices for adjustment of at least one seat and that is operated as a function of the predetermined pick-up time in such a way that, as one of the one or more predetermined states, the at least one seat is adjusted in a predetermined position;

a steering-wheel adjustment device operated as a function of the predetermined pick-up time in such a way that, as one of the one or more predetermined states, a steering wheel of the vehicle is adjusted in a predetermined position;

one or more mirror-adjustment devices operated as a function of the predetermined pick-up time in such a way that, as one of the one or more predetermined states, at least one mirror of the vehicle is adjusted in a predetermined position;

at least one of a radio and a navigation device that, as a function of and prior to the predetermined pick-up time, request at least one of current and future traffic information via a communication network with sufficient time to be able to download the requested traffic information via the communication network prior to the predetermined pick-up time, so that, as one of the one or more predetermined states, the at least one of the radio and navigation device stores the requested traffic information;

a door actuator for unlocking and locking one or more vehicle door and that is operated as a function of the predetermined pick-up time to unlock the one or more vehicle doors, so that as one of the one or more predetermined states, the vehicle has one or more unlocked vehicle doors at the predetermined pick-up time;

a navigation device that, as a function of and prior to the predetermined pick-up time, ascertains, or receives via a communication network, a route to a desired destination position, so that, as one of the one or more predetermined states, the vehicle has a navigation device prepared for navigation to the desired destination position;

includes a drive motor operated, as a function of the predetermined pick-up time and as one of the one or more predetermined states, to be in a started state, permitting the vehicle to drive off at the predetermined pick-up time;

a drive motor operated, as a function of the predetermined pick-up time and as one of the one or more predetermined states, to be adjusted into a started state with a predefined drive-motor dynamics mode, permitting the vehicle to drive off at the predetermined pick-up time;

a ride-adjustment device operated, as a function of the predetermined pick-up time, in such a way that, as one of the one or more predetermined states, the vehicle has a predefined adjusted ride;

an electronic stability program operated, as a function of the predetermined pick-up time, in such a way that, as one of the one or more predetermined states, the vehicle has a switched-on or a switched-off electronic stability program; or a front-passenger-side airbag operated, as a function of the predetermined pick-up time, in such a way that, as one of the one or more predetermined states, the vehicle has an activated or a deactivated front-passenger-side airbag.

2. The method of claim 1, wherein the one or more vehicle components includes at least one of an engine-independent heater and an air-conditioning system operated whose operation as a function of the predetermined pick-up time is such that the vehicle has the predetermined passenger-compartment temperature.

3. The method of claim 2, wherein the at least one of the air-conditioning system and engine-independent heater is operated in a recirculation mode or in a fresh-air mode.

4. The method of claim 3, further comprising measuring a quality of air surrounding the vehicle, and selecting between either the recirculation mode or the fresh-air mode as a function of the measured quality of the air surrounding the vehicle.

5. The method of claim 1, wherein the one or more vehicle components includes one or more driver assistance systems operated as a function of the predetermined pick-up time in such a way that, as one of the one or more predetermined states, the vehicle has one or more driver assistance systems ready for use.

6. The method of claim 1, wherein the one or more vehicle components includes one or more vehicle seat heaters operated as a function of the predetermined pick-up time in such a way that, as one of the one or more predetermined states, at least one seat of the vehicle assigned to the one or more vehicle seat heaters has a predetermined vehicle seat temperature.

7. The method of claim 1, wherein the one or more vehicle components includes one or more window heaters operated as a function of the predetermined pick-up time in such a way that, as one of the one or more predetermined states, at least one window of the vehicle assigned to the one or more window heaters is at least partially defrosted.

8. The method of claim 1, wherein the one or more vehicle components includes one or more seat-adjustment devices for adjustment of at least one seat and that is operated as a function of the predetermined pick-up time in such a way that, as one of the one or more predetermined states, the at least one seat is adjusted in a predetermined position.

9. The method of claim 1, wherein the one or more vehicle components includes a steering-wheel adjustment device operated as a function of the predetermined pick-up time in such a way that, as one of the one or more predetermined states, a steering wheel of the vehicle is adjusted in a predetermined position.

10. The method of claim 1, wherein the one or more vehicle components includes one or more mirror-adjustment devices operated as a function of the predetermined pick-up time in such a way that, as one of the one or more predetermined states, at least one mirror of the vehicle is adjusted in a predetermined position.

11. The method of claim 1, wherein the one or more vehicle components includes at least one of a radio and a navigation device that, as a function of and prior to the predetermined pick-up time, request at least one of current and future traffic information via a communication network with sufficient time to be able to download the requested traffic information via the communication network prior to the predetermined pick-up time, so that, as one of the one or more predetermined states, the at least one of the radio and navigation device stores the requested traffic information.

12. The method of claim 1, wherein the one or more vehicle components includes a door actuator for unlocking and locking one or more vehicle door and that is operated as a function of the predetermined pick-up time to unlock the one or more vehicle doors, so that as one of the one or more predetermined states, the vehicle has one or more unlocked vehicle doors at the predetermined pick-up time.

13. The method of claim 12, wherein, even with a passing of the predetermined pick-up time, the door actuator unlocks the one or more vehicle doors as a function of the predetermined pick-up time only if a least one person is detected at the pick-up position.

14. The method of claim 12, wherein, even with a passing of the predetermined pick-up time, the door actuator unlocks the one or more vehicle doors as a function of the predetermined pick-up time only if a least one person, who has been recognized as authorized for access of the vehicle, is detected at the pick-up position.

15. The method of claim 1, wherein the one or more vehicle components includes a navigation device that, as a function of and prior to the predetermined pick-up time, ascertains, or receives via a communication network, a route to a desired destination position, so that, as one of the one or more predetermined states, the vehicle has a navigation device prepared for navigation to the desired destination position.

16. The method of claim 15, wherein, after a driver of the vehicle has been detected getting into the vehicle, the navigation device makes the ascertained route available via a human-machine interface to the driver who has gotten in.

17. The method of claim 15, wherein the navigation device receives the desired destination position via the communication network and ascertains the route to the destination position based on the destination position.

18. The method of claim 1, wherein the one or more vehicle components includes a drive motor operated, as a function of the predetermined pick-up time and as one of the one or more predetermined states, to be in a started state, permitting the vehicle to drive off at the predetermined pick-up time.

19. The method of claim 1, wherein the one or more vehicle components includes a drive motor operated, as a function of the predetermined pick-up time and as one of the one or more predetermined states, to be adjusted into a started state with a predefined drive-motor dynamics mode, permitting the vehicle to drive off at the predetermined pick-up time.

20. The method of claim 1, wherein the one or more vehicle components includes a ride-adjustment device operated, as a function of the predetermined pick-up time, in such a way that, as one of the one or more predetermined states, the vehicle has a predefined adjusted ride.

21. The method of claim 1, wherein the one or more vehicle components includes an electronic stability program operated, as a function of the predetermined pick-up time, in such a way that, as one of the one or more predetermined states, the vehicle has a switched-on or a switched-off electronic stability program.

22. The method of claim 1, wherein the one or more vehicle components includes a front-passenger-side airbag operated, as a function of the predetermined pick-up time, in such a way that, as one of the one or more predetermined states, the vehicle has an activated or a deactivated front-passenger-side airbag.

23. The method of claim 1, further comprising determining or modifying the predetermined pick-up time based on position data of a mobile device associated with a vehicle user.

24. A system comprising:
a control device interfacing with one or more components of a vehicle, wherein the control device is configured to control operation of the one or more components as a function of a predetermined pick-up time of the vehicle at a pick-up position of a parking facility in such a way that the vehicle exhibits one or more predetermined states at the pick-up position at the predetermined pick-up time,
wherein the one or more vehicle components includes:
at least one of an engine-independent heater and an air-conditioning system operated whose operation as a function of the predetermined pick-up time is such that the vehicle has a predetermined passenger-compartment temperature;
one or more driver assistance systems operated as a function of the predetermined pick-up time in such a way that, as one of the one or more predetermined states, the vehicle has one or more driver assistance systems ready for use;
one or more vehicle seat heaters operated as a function of the predetermined pick-up time in such a way that, as one of the one or more predetermined states, at least one seat of the vehicle assigned to the one or more vehicle seat heaters has a predetermined vehicle seat temperature;
one or more window heaters operated as a function of the predetermined pick-up time in such a way that, as one of the one or more predetermined states, at least one window of the vehicle assigned to the one or more window heaters is at least partially defrosted;
one or more seat-adjustment devices for adjustment of at least one seat and that is operated as a function of the predetermined pick-up time in such a way that, as one of the one or more predetermined states, the at least one seat is adjusted in a predetermined position;
a steering-wheel adjustment device operated as a function of the predetermined pick-up time in such a way that, as one of the one or more predetermined states, a steering wheel of the vehicle is adjusted in a predetermined position;
one or more mirror-adjustment devices operated as a function of the predetermined pick-up time in such a way that, as one of the one or more predetermined states, at least one mirror of the vehicle is adjusted in a predetermined position;
at least one of a radio and a navigation device that, as a function of and prior to the predetermined pick-up time, request at least one of current and future traffic information via a communication network with sufficient time to be able to download the requested traffic information via the communication network prior to the predetermined pick-up time, so that, as one of the one or more predetermined states, the at least one of the radio and navigation device stores the requested traffic information;
a door actuator for unlocking and locking one or more vehicle door and that is operated as a function of the predetermined pick-up time to unlock the one or more vehicle doors, so that as one of the one or more predetermined states, the vehicle has one or more unlocked vehicle doors at the predetermined pick-up time;
a navigation device that, as a function of and prior to the predetermined pick-up time, ascertains, or receives via a communication network, a route to a desired destination position, so that, as one of the one or more predetermined states, the vehicle has a navigation device prepared for navigation to the desired destination position;
includes a drive motor operated, as a function of the predetermined pick-up time and as one of the one or more predetermined states, to be in a started state, permitting the vehicle to drive off at the predetermined pick-up time;
a drive motor operated, as a function of the predetermined pick-up time and as one of the one or more predetermined states, to be adjusted into a started state with a predefined drive-motor dynamics mode, permitting the vehicle to drive off at the predetermined pick-up time;
a ride-adjustment device operated, as a function of the predetermined pick-up time, in such a way that, as one of the one or more predetermined states, the vehicle has a predefined adjusted ride;
an electronic stability program operated, as a function of the predetermined pick-up time, in such a way that, as one of the one or more predetermined states, the vehicle has a switched-on or a switched-off electronic stability program; or
a front-passenger-side airbag operated, as a function of the predetermined pick-up time, in such a way that, as one of the one or more predetermined states, the vehicle has an activated or a deactivated front-passenger-side airbag.

25. The system of claim 24 further comprising the one or more vehicle components.

26. A vehicle comprising an apparatus that includes a control device interfacing with one or more components of the vehicle, wherein the control device is configured to control operation of the one or more components as a function of a predetermined pick-up time of the vehicle at a pick-up position of a parking facility in such a way that the vehicle exhibits one or more predetermined states at the pick-up position at the predetermined pick-up time,
wherein the one or more vehicle components includes:
at least one of an engine-independent heater and an air-conditioning system operated whose operation as a function of the predetermined pick-up time is such that the vehicle has a predetermined passenger-compartment temperature;
one or more driver assistance systems operated as a function of the predetermined pick-up time in such a way that, as one of the one or more predetermined states, the vehicle has one or more driver assistance systems ready for use;
one or more vehicle seat heaters operated as a function of the predetermined pick-up time in such a way that, as one of the one or more predetermined states, at least one seat of the vehicle assigned to the one or more vehicle seat heaters has a predetermined vehicle seat temperature;
one or more window heaters operated as a function of the predetermined pick-up time in such a way that, as one of the one or more predetermined states, at least one window of the vehicle assigned to the one or more window heaters is at least partially defrosted;
one or more seat-adjustment devices for adjustment of at least one seat and that is operated as a function of the predetermined pick-up time in such a way that, as one of the one or more predetermined states, the at least one seat is adjusted in a predetermined position;
a steering-wheel adjustment device operated as a function of the predetermined pick-up time in such a way that, as one of the one or more predetermined states, a steering wheel of the vehicle is adjusted in a predetermined position;
one or more mirror-adjustment devices operated as a function of the predetermined pick-up time in such a way that, as one of the one or more predetermined states, at least one mirror of the vehicle is adjusted in a predetermined position;
at least one of a radio and a navigation device that, as a function of and prior to the predetermined pick-up time, request at least one of current and future traffic information via a communication network with sufficient time to be able to download the requested traffic information via the communication network prior to the predetermined pick-up time, so that, as one of the one or more predetermined states, the at least one of the radio and navigation device stores the requested traffic information;
a door actuator for unlocking and locking one or more vehicle door and that is operated as a function of the predetermined pick-up time to unlock the one or more vehicle doors, so that as one of the one or more predetermined states, the vehicle has one or more unlocked vehicle doors at the predetermined pick-up time:
a navigation device that, as a function of and prior to the predetermined pick-up time, ascertains, or receives via a communication network, a route to a desired destination position, so that, as one of the one or more predetermined states, the vehicle has a navigation device prepared for navigation to the desired destination position;
includes a drive motor operated, as a function of the predetermined pick-up time and as one of the one or more predetermined states, to be in a started state, permitting the vehicle to drive off at the predetermined pick-up time;
a drive motor operated, as a function of the predetermined pick-up time and as one of the one or more predetermined states, to be adjusted into a started state with a predefined drive-motor dynamics mode, permitting the vehicle to drive off at the predetermined pick-up time;
a ride-adjustment device operated, as a function of the predetermined pick-up time, in such a way that, as one of the one or more predetermined states, the vehicle has a predefined adjusted ride;
an electronic stability program operated, as a function of the predetermined pick-up time, in such a way that, as one of the one or more predetermined states, the vehicle has a switched-on or a switched-off electronic stability program; or
a front-passenger-side airbag operated, as a function of the predetermined pick-up time, in such a way that, as one of the one or more predetermined states, the vehicle has an activated or a deactivated front-passenger-side airbag.

27. A non-transitory computer-readable medium on which are stored instructions that are executable by a processor and that, when executed by the processor, cause the processor to perform a method, the method comprising:

operating one or more vehicle components of a vehicle as a function of a predetermined pick-up time of the vehicle at a pick-up position of a parking facility in such a way that the vehicle exhibits one or more predetermined states at the pick-up position at the predetermined pick-up time, wherein the one or more vehicle components includes:

at least one of an engine-independent heater and an air-conditioning system operated whose operation as a function of the predetermined pick-up time is such that the vehicle has a predetermined passenger-compartment temperature;

one or more driver assistance systems operated as a function of the predetermined pick-up time in such a way that, as one of the one or more predetermined states, the vehicle has one or more driver assistance systems ready for use;

one or more vehicle seat heaters operated as a function of the predetermined pick-up time in such a way that, as one of the one or more predetermined states, at least one seat of the vehicle assigned to the one or more vehicle seat heaters has a predetermined vehicle seat temperature;

one or more window heaters operated as a function of the predetermined pick-up time in such a way that, as one of the one or more predetermined states, at least one window of the vehicle assigned to the one or more window heaters is at least partially defrosted;

one or more seat-adjustment devices for adjustment of at least one seat and that is operated as a function of the predetermined pick-up time in such a way that, as one of the one or more predetermined states, the at least one seat is adjusted in a predetermined position;

a steering-wheel adjustment device operated as a function of the predetermined pick-up time in such a way that, as one of the one or more predetermined states, a steering wheel of the vehicle is adjusted in a predetermined position;

one or more mirror-adjustment devices operated as a function of the predetermined pick-up time in such a way that, as one of the one or more predetermined states, at least one mirror of the vehicle is adjusted in a predetermined position;

at least one of a radio and a navigation device that, as a function of and prior to the predetermined pick-up time, request at least one of current and future traffic information via a communication network with sufficient time to be able to download the requested traffic information via the communication network prior to the predetermined pick-up time, so that, as one of the one or more predetermined states, the at least one of the radio and navigation device stores the requested traffic information;

a door actuator for unlocking and locking one or more vehicle door and that is operated as a function of the predetermined pick-up time to unlock the one or more vehicle doors, so that as one of the one or more predetermined states, the vehicle has one or more unlocked vehicle doors at the predetermined pick-up time:

a navigation device that, as a function of and prior to the predetermined pick-up time, ascertains, or receives via a communication network, a route to a desired destination position, so that, as one of the one or more predetermined states, the vehicle has a navigation device prepared for navigation to the desired destination position;

includes a drive motor operated, as a function of the predetermined pick-up time and as one of the one or more predetermined states, to be in a started state, permitting the vehicle to drive off at the predetermined pick-up time;

a drive motor operated, as a function of the predetermined pick-up time and as one of the one or more predetermined states, to be adjusted into a started state with a predefined drive-motor dynamics mode, permitting the vehicle to drive off at the predetermined pick-up time;

a ride-adjustment device operated, as a function of the predetermined pick-up time, in such a way that, as one of the one or more predetermined states, the vehicle has a predefined adjusted ride;

an electronic stability program operated, as a function of the predetermined pick-up time, in such a way that, as one of the one or more predetermined states, the vehicle has a switched-on or a switched-off electronic stability program; or a front-passenger-side airbag operated, as a function of the predetermined pick-up time, in such a way that, as one of the one or more predetermined states, the vehicle has an activated or a deactivated front-passenger-side airbag.

* * * * *